(12) United States Patent
Muñiz Casais

(10) Patent No.: US 9,825,507 B2
(45) Date of Patent: Nov. 21, 2017

(54) GENERATOR FOR A WIND TURBINE

(71) Applicant: ALSTOM RENEWABLE TECHNOLOGIES, Grenoble (FR)

(72) Inventor: César Muñiz Casais, Taradell (ES)

(73) Assignee: ALSTOM Renewable Technologies, Grenoble (FR)

( * ) Notice: Subject to any disclaimer, the term of this patent is extended or adjusted under 35 U.S.C. 154(b) by 225 days.

(21) Appl. No.: 14/437,191

(22) PCT Filed: Nov. 6, 2013

(86) PCT No.: PCT/EP2013/073161
§ 371 (c)(1),
(2) Date: Apr. 20, 2015

(87) PCT Pub. No.: WO2014/072338
PCT Pub. Date: May 15, 2014

(65) Prior Publication Data
US 2015/0256050 A1    Sep. 10, 2015

Related U.S. Application Data

(60) Provisional application No. 61/750,205, filed on Jan. 8, 2013.

(30) Foreign Application Priority Data

Nov. 8, 2012  (EP) ..................................... 12382439

(51) Int. Cl.
*H02K 7/18* (2006.01)
*F03D 9/00* (2016.01)
(Continued)

(52) U.S. Cl.
CPC ................. *H02K 7/18* (2013.01); *F03D 9/25* (2016.05); *H02K 1/06* (2013.01); *H02K 1/185* (2013.01);
(Continued)

(58) Field of Classification Search
CPC .... F03D 9/002; H02K 15/00; H02K 15/0006; H02K 15/02; H02K 15/03; H02K 15/16;
(Continued)

(56) References Cited

U.S. PATENT DOCUMENTS 5,844,341 A * 12/1998 Spooner ................. H02K 1/185
310/112
7,692,357 B2    4/2010 Qu et al.
(Continued)

FOREIGN PATENT DOCUMENTS

DE    10 2005060180    6/2006
EP    2164154    3/2010
(Continued)

*Primary Examiner* — Alex W Mok
(74) *Attorney, Agent, or Firm* — Dority & Manning, P.A.

(57) ABSTRACT

It comprises a rotor and a stator that they both may be formed of a single piece or they may be formed of a number of sectors. The generator further comprises at least one active module unit as an independent unit from both the rotor and the stator. The active module unit includes at least one permanent magnet, a magnet support structure attached thereto, a first attaching mechanism to removably attach the magnet support structure to the rotor or the stator, at least one coil module comprising at least one coil winding and a magnetic core, and a second attaching mechanism to removably attach the coil module to the other of the rotor or the stator. The coil module is spaced apart from the permanent magnet a predetermined distance.

12 Claims, 3 Drawing Sheets

(51) Int. Cl.
| | |
|---|---|
| *H02K 3/46* | (2006.01) |
| *H02K 15/02* | (2006.01) |
| *H02K 1/27* | (2006.01) |
| *H02K 1/30* | (2006.01) |
| *H02K 1/06* | (2006.01) |
| *H02K 1/18* | (2006.01) |
| *F03D 9/25* | (2016.01) |
| *H02K 15/00* | (2006.01) |
| *H02K 15/03* | (2006.01) |
| *H02K 15/16* | (2006.01) |

(52) U.S. Cl.
CPC .............. *H02K 1/27* (2013.01); *H02K 1/30* (2013.01); *H02K 3/46* (2013.01); *H02K 15/02* (2013.01); *H02K 7/183* (2013.01); *H02K 15/00* (2013.01); *H02K 15/0006* (2013.01); *H02K 15/03* (2013.01); *H02K 15/16* (2013.01); *H02K 2201/03* (2013.01); *H02K 2213/12* (2013.01); *Y02E 10/725* (2013.01); *Y10T 29/49012* (2015.01)

(58) Field of Classification Search
CPC  H02K 1/06; H02K 1/185; H02K 1/27; H02K 1/30; H02K 2201/03; H02K 2213/12; H02K 3/46; H02K 7/18; H02K 7/183; Y02E 10/725; Y10T 29/49012
USPC ........................ 310/156.12; 29/598
See application file for complete search history.

(56) References Cited

U.S. PATENT DOCUMENTS

| | | | |
|---|---|---|---|
| 2008/0309189 A1* | 12/2008 | Pabst | H02K 1/148 310/216.008 |
| 2009/0134627 A1 | 5/2009 | Stiesdal | |
| 2011/0266909 A1 | 11/2011 | Lokhandwalla et al. | |
| 2012/0098271 A1* | 4/2012 | Bayer | H01F 7/0221 290/55 |
| 2012/0112466 A1 | 5/2012 | Junge et al. | |
| 2012/0187793 A1* | 7/2012 | Hartmann | H02K 1/278 310/156.28 |
| 2014/0028138 A1* | 1/2014 | Feher | F03D 1/001 310/156.08 |

FOREIGN PATENT DOCUMENTS

| | | |
|---|---|---|
| EP | 2508749 | 9/2013 |
| WO | WO 2006/032969 | 3/2006 |
| WO | WO 2011/031165 | 3/2011 |

* cited by examiner

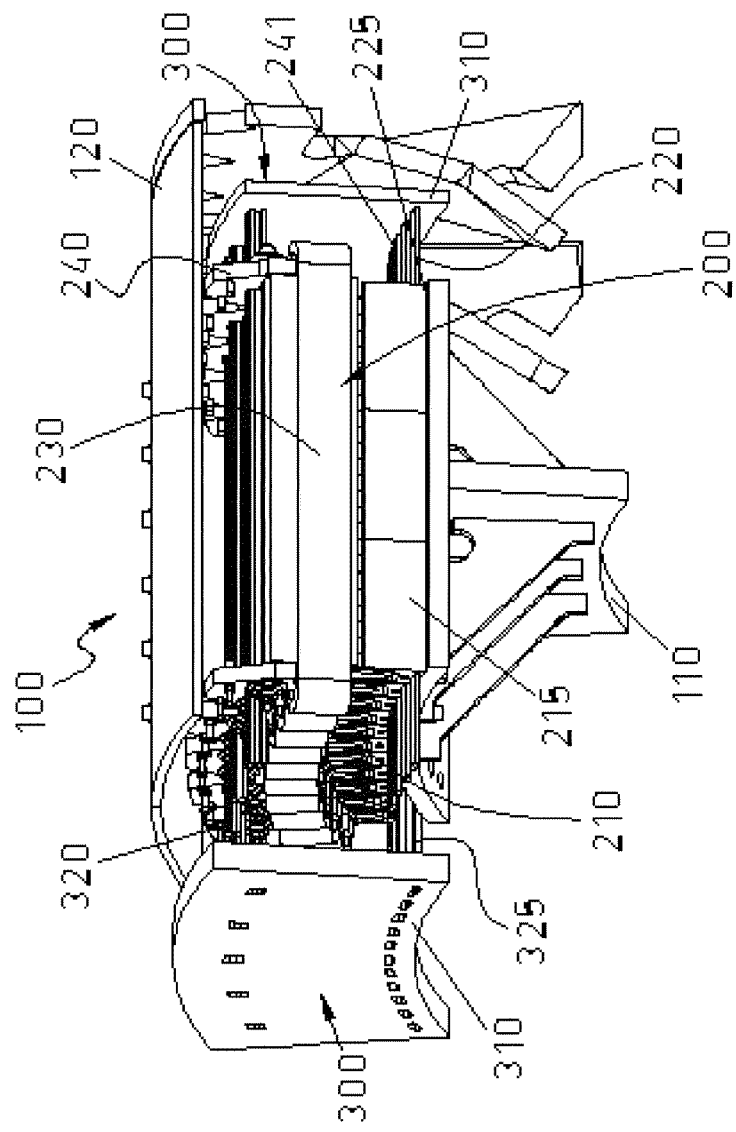

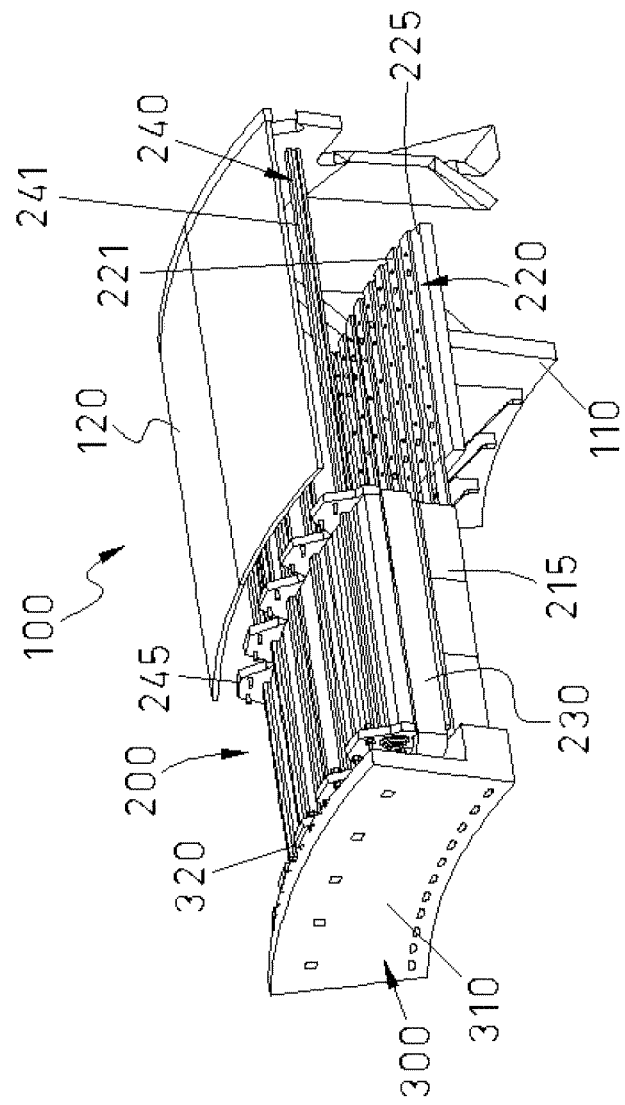

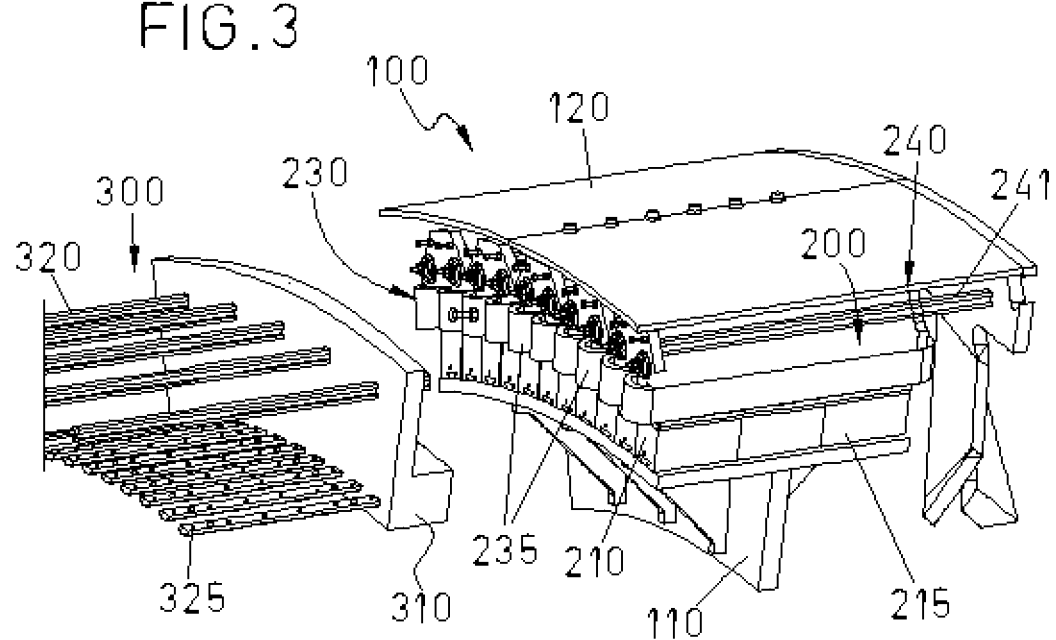
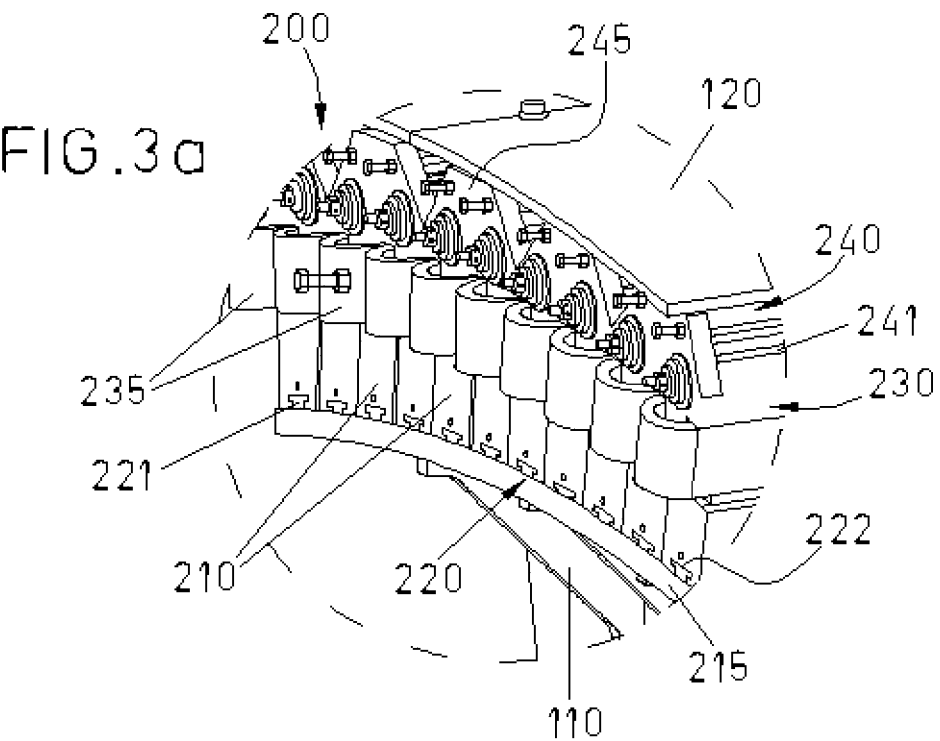

GENERATOR FOR A WIND TURBINE

TECHNICAL FIELD

A generator for a wind turbine is disclosed. A method for mounting such wind turbine generator is also disclosed.

BACKGROUND

Current wind turbines are producing increasingly more power. This increase in power production is especially more prevalent in direct-drive wind turbines, that is, those using permanent magnets and with no gearbox, involving extremely large generator structures that are required for such amounts of power.

Large generators are very difficult to handle due to their very big size and weight. Furthermore, permanent magnet generators suffer from the problem of handling of active parts. Active parts include the permanent magnets and coil windings. Permanent magnets, which are fitted in the rotor of the generator, remain always active with no need for an excitation current. A magnetic field is thus always present, which renders handling of active parts very complex, both during installation and replacement operations.

In order to ease transportation in such wind turbines, modular technology is now being applied to at least some parts of the generator. The modular technology has been shown to be a good solution to reduce the problem of logistics since with modular technology generators do not have to be transported as a whole.

In this respect, segmented wind turbine stators have been proposed as described in EP2164154. Segmented wind turbine rotors have been also provided as shown in US20110266909. Other examples, such as in US2009134627, provide directly driven generators for wind turbines comprising stators formed of stator segments and rotors formed of rotor segments.

Another approach is to provide generators where both the rotor and the stator are segmented. This is shown, for example, in US2012112466, which discloses a wind turbine generator comprising a rotor and a stator that are both divided into a plurality of segments. The rotor segments are fitted with permanent magnets while the stator segments are fitted with corresponding coils. When the generator is being produced, the stator segments and the rotor segments are joined together by means of connecting elements. Through such connecting elements, the rotor and the stator are spaced apart from each other via an air gap separating them.

Document WO2011031165 also refers to a wind turbine generator comprising stator and rotor segments. The stator segments include a stator housing adapted to be arranged to one side of a bearing unit. Inside the stator housing stator windings divided into segments can be arranged. The rotor segments include magnet supports for the fixation of magnets. The rotor segments with magnets are positioned in place with special tools to keep the right air gap relative to the stator windings inside each generator stator segment. The stator segments and the rotor segments are locked to each other by a preliminary locking system.

The above solutions are specifically directed to the above mentioned problem of how to ease the transportation of the generator to the site of erection. As stated, this is carried out presently by dividing the generator rotor and/or the generator stator in substantially similar segments.

However, no efficient and cost effective solutions are described to date in the prior art for facilitating operations of maintenance and repair of the generator, even in the event that the generator is not segmented, or segmented in large parts. The applicant has found that, in addition to transportation and logistics, other important technical problems need to be solved or at least partially reduced in wind turbine generators such as transportation and storage of active parts.

SUMMARY

A generator for a wind turbine comprising: a rotor; a stator; and at least an active module unit that is independent from both the rotor and the stator. The active module unit comprises a sandwich structure including: at least one permanent magnet; a magnet support structure attached to the at least one permanent magnet; a first attaching mechanism to removably attach the magnet support structure to the rotor or the stator; at least one coil module comprising at least one coil and a magnetic core; and a second attaching mechanism to removably attach the coil module to the other of the rotor or the stator; and with the coil module spaced apart from the permanent magnet a predetermined distance that defines the air gap for the magnetic flux.

A method for mounting a wind turbine generator, the generator comprising a rotor and a stator and at least an active module unit independent from both the rotor and the stator, the active module unit comprising a sandwich structure including at least one permanent magnet, a magnet support structure attached thereto, at least one coil module comprising at least one coil winding and a magnetic core, and a second attaching mechanism to removably attach the coil module to the other of the rotor or the stator, with the coil module spaced apart from the permanent magnet a predetermined distance, the method comprising the steps of mounting the active module unit, removably attaching the magnet support structure to one of the rotor and the stator and removably attaching the coil module to the other of the rotor and the stator.

The wind turbine generator disclosed herein comprises a rotor, a stator, and at least an active module unit. For the purposes of the object of the present disclosure, it is important to note that the active module unit is defined as an independent unit from both the rotor and the stator. The term independent as used herein means that the unit does not require or does not rely on additional parts to be mounted to the generator. For this purpose, the active module unit itself is provided with a removably attaching mechanism besides the active parts. This mechanism removably attaches the active module unit to the generator. Therefore, the active module unit can be attached to and detached from the rotor and the stator of the wind turbine generator as a separate unit.

More specifically, the active module unit of the present generator comprises a sandwich structure. This sandwich structure includes:
  at least one permanent magnet;
  a magnet support structure attached to the permanent magnet;
  a first attaching mechanism to removably attach the magnet support structure to the rotor or the stator;
  at least one coil module comprising at least one coil winding and a magnetic core; and
  a second attaching mechanism to removably attach the coil module to the other of the rotor or the stator.

Advantageously, the present generator is provided with an active module unit which on the one hand is independent from the generator itself and on the other hand the sandwich structure combines active parts, i.e. the magnet, the magnetic core, the coils, etc. and an attaching mechanism to removably attach the unit to both the rotor and the stator of the generator.

In the sandwich structure that forms an active module unit independent of the rotor and the stator of the wind turbine generator, the coil module comprising the magnetic core and the coil is spaced apart from the permanent magnet a predetermined distance that defines the air gap for the magnetic flux.

One important advantage of the present generator is that the active module unit can be applied both to segmented generators, where the rotor and the stator may comprise two or more sectors or segments, and to non-segmented generators, where the rotor and the stator are made of a single piece.

The structure of an independent active module unit as defined allows the active parts to be conveniently mounted on an already manufactured generator, irrespective of whether a generator is formed of a single module or sector or a plurality of modules or sectors.

In some particular examples of the present generator, the rotor or the stator may comprise a number of radial spokes. Each radial spoke may have at least one end surface. In especially preferred examples the generator rotor comprises a number of radial spokes.

Several examples of the first attaching mechanism to removably attach the magnet support structure to the rotor or the stator are envisaged. In some examples, the first attaching mechanism may comprise a number of longitudinal grooves formed on the magnet support structure suitable for receiving corresponding longitudinal members protruding from a surface of a portion of the rotor. The longitudinal guides may be dovetail cross sectional longitudinal members protruding from a surface of a portion of the rotor. This portion of the rotor may be formed on a rotor rim, or on the end surface of the spokes. However, there could be examples in which the magnet support structure comprises longitudinal members protruding therefrom suitable for being inserted into corresponding longitudinal grooves formed on a surface of a portion of the rotor. Still, in alternative examples, the first attaching mechanism may comprise at least one attaching plate to be attached both to the rotor (e.g. to the rotor rim, the end surface of the spokes, etc.) and the magnet support structure. Attachment may be carried out by gluing, through screws, etc. The attaching plate may be in the form of clamping elements to be bolted to the rotor.

At least one of the magnet support structure and the coil module of the active module unit may be adapted for being removably attached to the rotor and the stator by sliding onto one portion thereof. The active module unit can be adapted for being mounted axially or radially to the generator.

As to the second attaching mechanism to removably attach the coil module to the other of the rotor or the stator, they may comprise a number of holding bars attached to the stator suitable for passing through at least one hole formed in one holding portion formed in the coil module.

The active module unit may further comprise a clamping mechanism for temporarily retaining the magnet support structure and the coil module to each other in place. In this configuration, the coil module comprising the magnetic core and the coil is spaced apart from the permanent magnet a predetermined distance that defines the air gap for the magnetic flux.

The clamping mechanism may comprise at least one clamping plate, such as for example two clamping plates. Each plate has a first end coupled to the magnet or to the magnet support structure of the active module unit and a second end coupled to the coil module. Coupling of the clamping plate ends to the magnet or to the magnet support structure and the coil module may be carried out, for example, through clamping bars. These clamping bars may be permanent, that is, they can be adapted to remain in the active module unit when mounted on the generator. The clamping bars may be removed together with the clamping plates as the clamping mechanism is removed from the generator once the active module unit has been mounted to the generator.

The active module unit of the present generator advantageously combines rotor and stator active parts together while keeping the magnetic field closed. This allows the active module unit to be easily handled with no influence of the magnetic fields. The present generator is especially advantageous in operations of assembly, replacing, repair and servicing. The active module unit can be assembled in a controlled manner in a manufacturing plant, thus improving replacement operations at the wind farm site.

A method for mounting the above wind turbine generator is also provided. The method comprises providing at least one of the above described active module units. The rotor and the stator of the generator may be assembled first, if necessary. Then the active module unit is mounted. Then the magnet support structure is removably attached to one of the rotor and the stator and the coil module is removably attached to the other of the rotor and the stator. Mounting of the active module unit may be carried out by sliding the module to the rotor inserting the above mentioned longitudinal members into said grooves formed in the magnet support structure while inserting the holding bars of the stator into corresponding holes formed in holding portions of the coil module as described. Finally, a step of removing the clamping mechanism may be performed. This step may be carried out simultaneously as the active module unit mounting is being carried out.

The above method further simplifies operations of assembly, repair and maintenance of the generator since an active module unit is used which is independent from the generator and with a sandwich structure that combines active parts and an attaching mechanism to removably attach the unit to both the rotor and the stator of the generator.

Additional objects, advantages and features of examples of the present generator for a wind turbine will become apparent to those skilled in the art upon examination of the description, or may be learned by practice thereof.

BRIEF DESCRIPTION OF THE DRAWINGS

Particular examples of the present generator for a wind turbine will be described in the following by way of non-limiting examples, with reference to the appended drawings.

In the drawings:

FIGS. 1 and 2 are general perspective part views of one example of the present generator with the active module unit shown in partially assembled conditions;

FIG. 3 is a general perspective part view of the example of the present generator shown in FIGS. 1 and 2 with the active module unit shown in an assembled condition with the attaching mechanism shown in a fully disassembled condition; and FIG. 3a is an enlarged view of a selected portion of FIG. 3.

DETAILED DESCRIPTION OF EXAMPLES

One particular and non-limiting example of the present wind turbine generator will be disclosed in the following with reference to the drawings. Like reference numerals refer to like parts throughout the present description of the views of the drawings.

The example of the present wind turbine generator shown in the figures is indicated as a whole by reference numeral 100. The present wind turbine generator 100 comprises a rotor 110 and a stator 120. Both the rotor 110 and the stator 120 may be formed of a single piece or they may be formed of a number of segmented pieces, that is, the rotor 110 and the stator 120 may be formed of a at least two individual sectors. The figures show one segment of the present generator 100. It is however understood that the whole generator 100 would correspond to the 360° of the complete assembly.

The wind turbine generator 100 in the example shown in FIGS. 1-3 further comprises an active module unit 200. The active module unit 200 is adapted to be mounted in correspondence with the rotor 110 and the stator 120 as shown.

As illustrated in FIGS. 1-3 of the drawings, the active module unit 200 of the generator 100 is independent from both the rotor 110 and the stator 120. This means that the active module unit 200 is not dependant or under influence or control of the generator rotor and stator 110, 120. As a consequence, the active module unit 200 can be attached to and detached from the generator 100 with no need of additional parts. The active module unit 200 is capable of performing its intended function regardless of the structure of the generator 100.

FIGS. 1-3 show different relative positions of the active module unit 200 to the rotor and the stator 110, 120 of the generator 100, that is, with the active module unit 200 shown in partially assembled conditions.

The example of the active module unit 200 depicted in the figures comprises a sandwich structure. A sandwich structure is to be understood as a structure comprising something (an air gap) placed between at least two elements.

More specifically, and as shown in the figures of the drawings, the sandwich structure of the active module unit 200 comprises a number of permanent magnets 210. In this particular example, the permanent magnets 210 are embedded into a magnet module. However, there could be examples where the magnet module material does not surround the magnets 210.

The magnet module comprises a base or magnet support structure 215 that is attached to the permanent magnets 210. The magnets 210 can be attached to the support structure 215 by gluing, for example. The magnets 210 may be arranged either in an inclined, vertical or horizontal direction with respect to the radial direction of the generator, or in a combination of these.

The sandwich structure of the active module unit 200 also comprises a first attaching mechanism 220 to removably attach the magnet support structure 215 to the rotor 110. As shown in the enlarged view of FIG. 3a, the first attaching mechanism 220 comprises a number of dovetail shaped longitudinal grooves 221. The longitudinal grooves 221 are formed on the magnet support structure 215. The longitudinal grooves 221 are sized and shaped for receiving corresponding dovetail shaped longitudinal members 222 protruding from a surface of a portion of the rotor 110.

The sandwich structure of the active module unit 200 further comprises at least one coil module 230. Such coil module 230 comprises at least one coil winding 235 and a magnetic core. The magnetic core in the coil module 230 is one active part of the active module unit 200 that guides the magnetic field generated by the permanent magnet 210. The magnetic core comprises one or a number of teeth around which the windings are provided. In each active module unit 200 a slot pitch is defined as the circumferential distance of one tooth to the adjacent tooth. The arrangement of elements in the coil module 230 (coil windings, magnetic cores, etc.) will such that a magnetic field is generated.

The sandwich structure of the active module unit 200 further comprises second attaching mechanism 240 to removably attach the coil module 230 to the stator 120. More specifically, the second attaching mechanism 240 allows the magnetic core to be removable attached to the stator 120. In the active module unit 200, the coil module 230 comprising the magnetic core and the coil 235 is spaced apart from the permanent magnet 210 a predetermined distance that defines the air gap for the magnetic flux.

As shown in FIG. 3, the second attaching mechanism 240 comprises a number of holding bars 241. The holding bars 241 are attached to the stator 120. The holding bars 241 are suitable for passing through respective holes formed in corresponding holding portions 245 of the coil module 230, as clearly shown in FIG. 2. The holding portions 245 have been shown as sets of two opposite protruding parts having respective holes. Such protruding parts extend from the top of the coil module 230 as shown in the figures. However, the holding portions 245 could be formed as sets of entire portions protruding from the top of, and along the coil module 230 and provided with an inner hole; that is, the holding portions 245 could be continuous instead of being formed of sets of two opposite protruding parts with holes.

In the example shown, the generator rotor comprises at least one radial spoke 110. Where the present generator 100 is of the segmented type, the radial spokes 110 may be arranged in correspondence with the rotor segments. The radial spokes 110 have an end surface 225 where the above mentioned dovetail shaped longitudinal members 222 are formed.

The active module unit 200 further comprises a clamping mechanism 300 for temporarily securing the coil module 230 and the magnet support structure 215 to each other in a preassembled condition. The clamping mechanism 300 is configured to ensure that the magnetic core together with the coil 235 are spaced apart from the permanent magnet a predetermined distance to prevent an air gap collapse during assembly due to the attraction forces induced by the generated magnetic field of the magnets.

The clamping mechanism 300 is temporary as stated above. This means that it is released when the active module unit 200 is mounted to the generator 100, as shown in FIG. 3.

The example of the clamping mechanism 300 shown in the figures comprises a pair of opposite clamping plates 310 and sets of clamping bars 320, 325. The two sets of clamping bars 320, 325 are arranged substantially parallel to each other and substantially perpendicular to the surface of the clamping plates 310. The clamping bars 320 are arranged in two sets, an upper set of clamping bars 320 extending from an upper portion of the clamping plates 310, and a lower set of clamping bars 320 extending from a lower portion of said opposite clamping plates 310. The upper set of clamping bars 320 support the coil module 230 while the lower set of clamping bars 325 support the magnet support structure 215 with the permanent magnet 210.

For mounting the present wind turbine generator 100 or in performing operations of repair or maintenance of the generator 100, at least one of the above active module units 200 is provided in a preassembled condition. This is carried out by providing the sandwich structure with the support the magnet support structure 215 and the permanent magnets 210 clamped to the coil module 230 by means of the clamping mechanism 300. After assembling the rotor 110 and the stator 120 of the generator 100, if they have not been still assembled to the generator, the original active parts, such as the permanent magnet and the coil windings 235, must be removed first. This removal step is necessary when the present active module unit 200 is to be applied to a non-segmented generator. Then the active module unit 200 is mounted to the generator 100 by removably attaching the magnet support structure 215 to the rotor 110 and removably attaching the coil module 230 to the stator 120. This is carried out in the example shown by sliding the dovetail longitudinal members 222 in the end surface 225 of the spoke 110 into the longitudinal grooves 221 of the magnet support structure 215 that define the first attaching mechanism 220 while at the same time the holding bars 241 attached to the stator are passed through the holes formed in the holding portion 245 of the coil module 230 that define the second attaching mechanism 240.

Removable attachment of the active module unit 200 is performed by sliding the assembly axially or radially towards the generator 100. Once the active module unit 200 is assembled in the generator 100, the clamping mechanism 300 is removed from the active module unit 200 as shown in FIG. 3 of the drawings.

Although only a number of particular examples and examples of the generator for a wind turbine have been disclosed herein, it will be understood by those skilled in the art that other alternative examples and/or uses of the generator for a wind turbine and obvious modifications and equivalents thereof are possible.

For example, although the present disclosure has been focused primarily to an active module unit 200 for a segmented generator, the disclosure is equally efficient regardless the type of generator, including non-segmented generators, that is, provided with rotor and stator each made of a single piece.

The present disclosure thus covers all possible combinations of the particular examples described and it should not be limited by the particular examples disclosed herein, but should be determined only by a fair reading of the claims that follow.

Reference signs related to drawings and placed in parentheses in a claim, are solely for attempting to increase the intelligibility of the claim, and shall not be construed as limiting the scope of the claim.

The invention claimed is:

1. A generator for a wind turbine comprising:
a rotor;
a stator; and
at least an active module unit that is independent from both the rotor and the stator;
the active module unit comprising a sandwich structure including:
at least one permanent magnet;
a magnet support structure attached to the at least one permanent magnet;
a first attaching mechanism to removably attach the magnet support structure to one of the rotor and the stator;
at least one coil module comprising at least one coil and a magnetic core;
a second attaching mechanism to removably attach the coil module to the other of the rotor and the stator;
wherein the active module unit further comprises a clamping mechanism for temporarily securing the coil module and the magnet support structure to each other such that the magnetic core and the coil are spaced apart from each other by a predetermined distance; and
wherein the clamping mechanism comprises a pair of opposite clamping plates and sets of clamping bars for temporarily supporting the coil module and the magnet support structure, respectively.

2. The generator of claim 1, wherein the first attaching mechanism comprises a number of longitudinal grooves formed on the magnet support structure, the longitudinal grooves being suitable for receiving corresponding longitudinal members protruding from a portion of the rotor.

3. The generator of claim 2, wherein the rotor or the stator comprises a number of radial spokes having at least one end surface where a number of the longitudinal members are formed.

4. The generator of claim 1, wherein the second attaching mechanism comprises a number of holding bars attached to the stator and suitable for passing through at least one hole formed in one holding portion of the coil module.

5. The generator of claim 1, wherein both the rotor and the stator comprise at least two sectors.

6. The generator of claim 1, wherein at least one of the magnet support structure or the coil module of the active module unit is adapted for being removably attached to the rotor and the stator by sliding axially or radially therein.

7. The generator of claim 1, wherein the permanent magnet of the sandwich structure is arranged either in an inclined, vertical or horizontal direction with respect to a radial direction of the generator.

8. The generator of claim 1, wherein the clamping mechanism comprises an upper set of clamping bars extending from an upper portion of the clamping plates for supporting the coil module, and a lower set of clamping bars extending from a lower portion of the opposite clamping plates for supporting the magnet support structure.

9. A method for mounting a wind turbine generator, the generator comprising a rotor and a stator and at least an active module unit independent from both the rotor and the stator, the active module unit comprising a sandwich structure including at least one permanent magnet, a magnet support structure attached thereto, a first attaching mechanism to removably attach the magnet support structure to one of the rotor and the stator, at least one coil module comprising at least one coil winding and a magnetic core, a clamping mechanism for temporarily securing the coil module and the magnet support structure to each other such that the magnetic core and the coil are spaced apart from each other by a predetermined distance, the clamping mechanism comprising a pair of opposite clamping plates and sets of clamping bars for temporarily supporting the coil module and the magnet support structure, respectively, and a second attaching mechanism to removably attach the coil module to the other of the rotor or the stator,
the method comprising the steps of:
mounting the active module unit,
removably attaching the magnet support structure to one of the rotor and the stator, and
removably attaching the coil module to the other of the rotor and the stator.

10. The method of claim 9, wherein the method comprises a further step of removing the clamping mechanism that temporarily supports the coil module and the magnet support structure, respectively.

11. The method of claim 9, wherein the active module unit mounting step is carried out by sliding the magnet support structure towards one of the rotor and the stator and the coil module towards the other of the rotor and the stator.

12. The method of claim 9, wherein the active module unit is mounted axially or radially to the generator.

\* \* \* \* \*